United States Patent [19]

Sakaguchi

[11] Patent Number: 5,106,280
[45] Date of Patent: Apr. 21, 1992

[54] CENTER MECHANISM OF A TIRE VULCANIZING MACHINE

[75] Inventor: Katsuyoshi Sakaguchi, Nagasaki, Japan

[73] Assignee: Mitsubishi Jukogyo Kabushiki Kaisha, Tokyo, Japan

[21] Appl. No.: 556,252

[22] Filed: Jul. 19, 1990

[30] Foreign Application Priority Data

Aug. 2, 1989 [JP] Japan .................................. 1-199204

[51] Int. Cl.⁵ ........................ B29C 35/02; B29D 30/02
[52] U.S. Cl. ........................................ 425/38; 425/48; 425/52; 425/58; 425/400
[58] Field of Search ................ 425/38, 39, 40, 44, 425/47, 48, 51, 52, 58, 400, 403.1, 36, 56, 58, 443, 390, 389

[56] References Cited

U.S. PATENT DOCUMENTS

| | | | |
|---|---|---|---|
| 3,579,736 | 5/1971 | Balle et al. | 425/38 |
| 4,670,209 | 6/1987 | Nakagawa et al. | 425/52 |
| 4,768,937 | 9/1988 | Singh | 425/44 |
| 4,846,649 | 7/1989 | Hasegawa et al. | 425/51 |
| 4,871,305 | 10/1989 | Galigani | 425/38 |

FOREIGN PATENT DOCUMENTS

| | | | |
|---|---|---|---|
| 56-166040 | 12/1981 | Japan | 425/38 |
| 58-183238 | 10/1983 | Japan | 425/38 |

Primary Examiner—Jay H. Woo
Assistant Examiner—Khanh P. Nguyen
Attorney, Agent, or Firm—Wenderoth, Lind & Ponack

[57] ABSTRACT

In a center mechanism of a tire vulcanizing machine equipped with four kinds of hydraulic cylinders, lower end portions of a plurality of rods are made insertable into holes provided in a beam to transmit a pressing force generated by a pressurized hot medium to stoppers through the respective rods upon vulcanization of a tire. Upon completion of vulcanization of the tire, the stoppers are made to swing to lower the respective rods.

12 Claims, 7 Drawing Sheets

CENTER MECHANISM OF A TIRE VULCANIZING MACHINE

BACKGROUND OF THE INVENTION

1. Field of the Invention

The present invention relates to a centering mechanism of a tire vulcanizing machine equipped with four kinds of hydraulic cylinders.

2. Description of the Prior Art

In a center mechanism of a tire vulcanizing machine having a center post, normally the following two types of operation methods have been practiced:

1. A method of accommodating a bladder in a twofolded state, which is disclosed, for example, in Laid-Open Japanese Patent Specification No. 51-17282 (1976).
2. A method of effecting only elongation of a bladder, which is disclosed, for instance, in Laid-Open Japanese Patent Specification No. 57-39941 (1982).

The above-referred operation methods in the prior art involve the following problems. That is, in the case of the above-mentioned method 1 of accommodating a bladder in a twofolded state, when a bladder is accommodated within an inner cylinder, sometimes a four-folded portion may occur in view of volume restrictions and the bladder may begin to be damaged from that portion. In the case of the aforementioned method 2 of effecting only elongation of a bladder, an inner-grip unloader cannot be used upon removing a vulcanized tire because a bladder is present at a central portion. An outer-grip unloader becomes necessary, and so in addition to increased costs, the precision of the removal becomes poor. Also, upon inserting a green tire, the vertical stroke of a loader becomes long, and hence the cycle time is increased.

In addition, besides the aforementioned two methods, there is a method 3 of accommodating a bladder that is maintained elongated, but this method 3 still involves structural problems and has not yet come into common use.

SUMMARY OF THE INVENTION

The present invention has been proposed in view of the above-mentioned problems in the prior art, and it is one object of the present invention to provide an improved center mechanism of a tire vulcanizing machine in which the aforementioned three types of bladder operations adapted different kinds of tires can be carried out by changing only the control, without necessitating the replacement of a center mechanism, the addition of parts, or the like, whereby the problems of high cost, poor removal precision, increased cycle time and the like can be resolved.

In order to achieve the aforementioned object, the present invention proposes to construct a center mechanism of a tire vulcanizing machine equipped with four kinds of hydraulic cylinders. A plurality of rods transmit a pressing force generated by a pressurized hot medium to stoppers through the respective rods upon vulcanization of a tire. Upon completion of vulcanization of the tire, the stoppers are made to swing to lower the respective rods.

In other words, according to one feature of the present invention, there is provided a center mechanism of a tire vulcanizing machine equipped with four kinds of hydraulic cylinders, wherein a lower ring member connected to a plurality of vertically movable rods is disposed at a central portion of a lower mold of a tire vulcanizing machine so as to be insertable and detachable. Upon vulcanization of a tire, the lower ring member is inserted into the lower mold by raising the rods, and then it is supported by means of stoppers below below. But upon completion of vulcanization of the tire, the aforementioned rods are lowered by making the stoppers swing, and the lower ring member is detached.

According to the present invention, due to the aforementioned structural feature, upon vulcanization a pressing force generated by a pressurized hot medium is transmitted via the aforementioned rods to the stoppers. Upon completion of the vulcanization of the tire the stoppers are made to swing and the rods are lowered to accommodate a bladder within an inner cylinder.

As a result of the aforementioned mode of operations, according to the present invention, the previously mentioned three types of bladder operations, adapted to the different kinds of tires, can be carried out by only changing the control without necessitating the replacement of a center mechanism, the addition of parts or the like. There is also the advantage that the aforementioned problems of high cost, poor removal precision and increased cycle time can be resolved.

The above and other objects, features and advantages of the present invention will become more apparent by reference to the following description of one preferred embodiment of the invention taken in conjunction with the accompanying drawings.

DESCRIPTION OF THE PREFERRED EMBODIMENT

Figure 1:
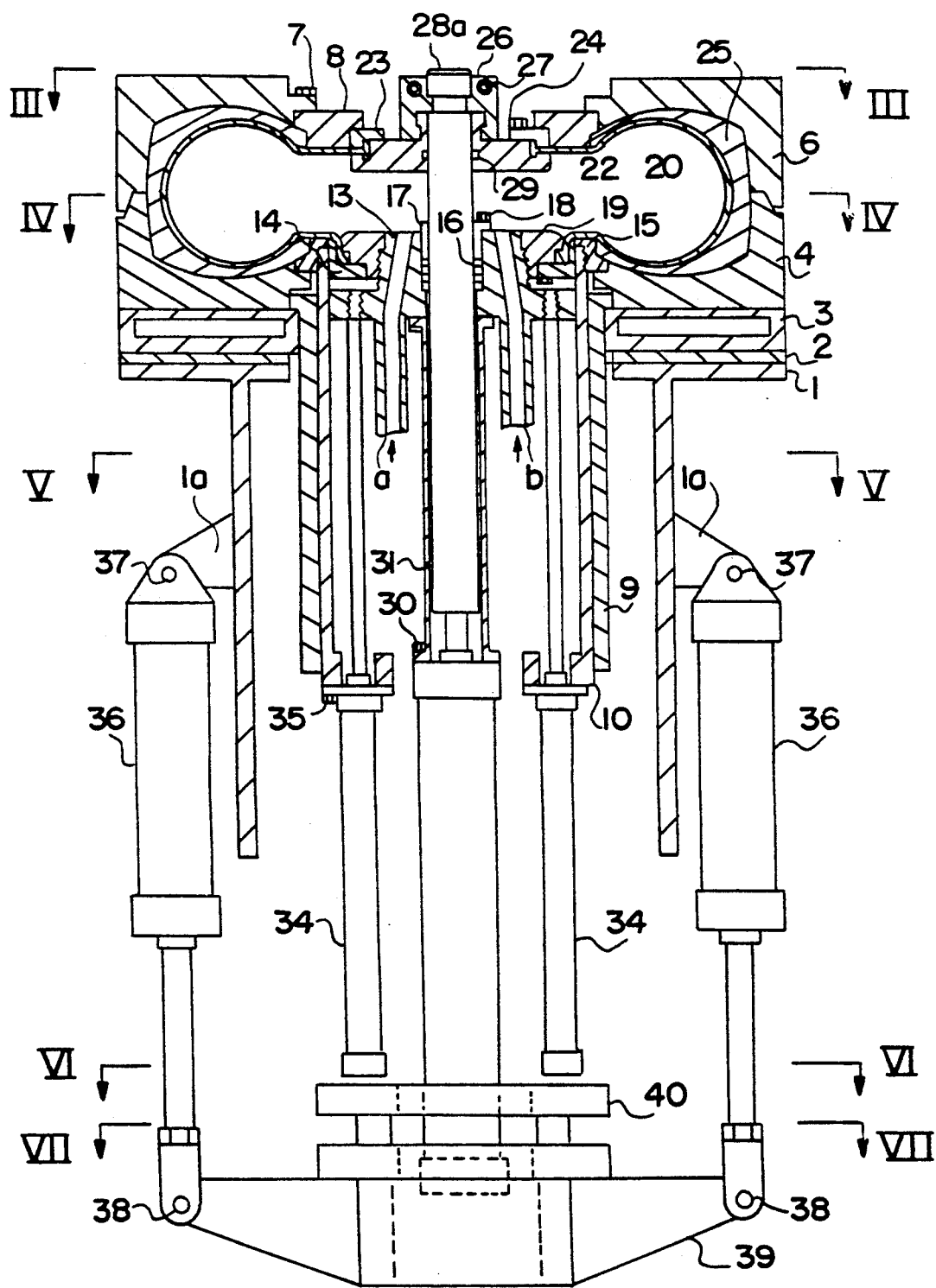
FIG. 1 is a longitudinal cross-sectional side view of the preferred embodiment of a center mechanism of a tire vulcanizing machine according to the present invention, taken along line I—I in FIG. 5 as viewed in the direction of the arrows.
Figure 2:
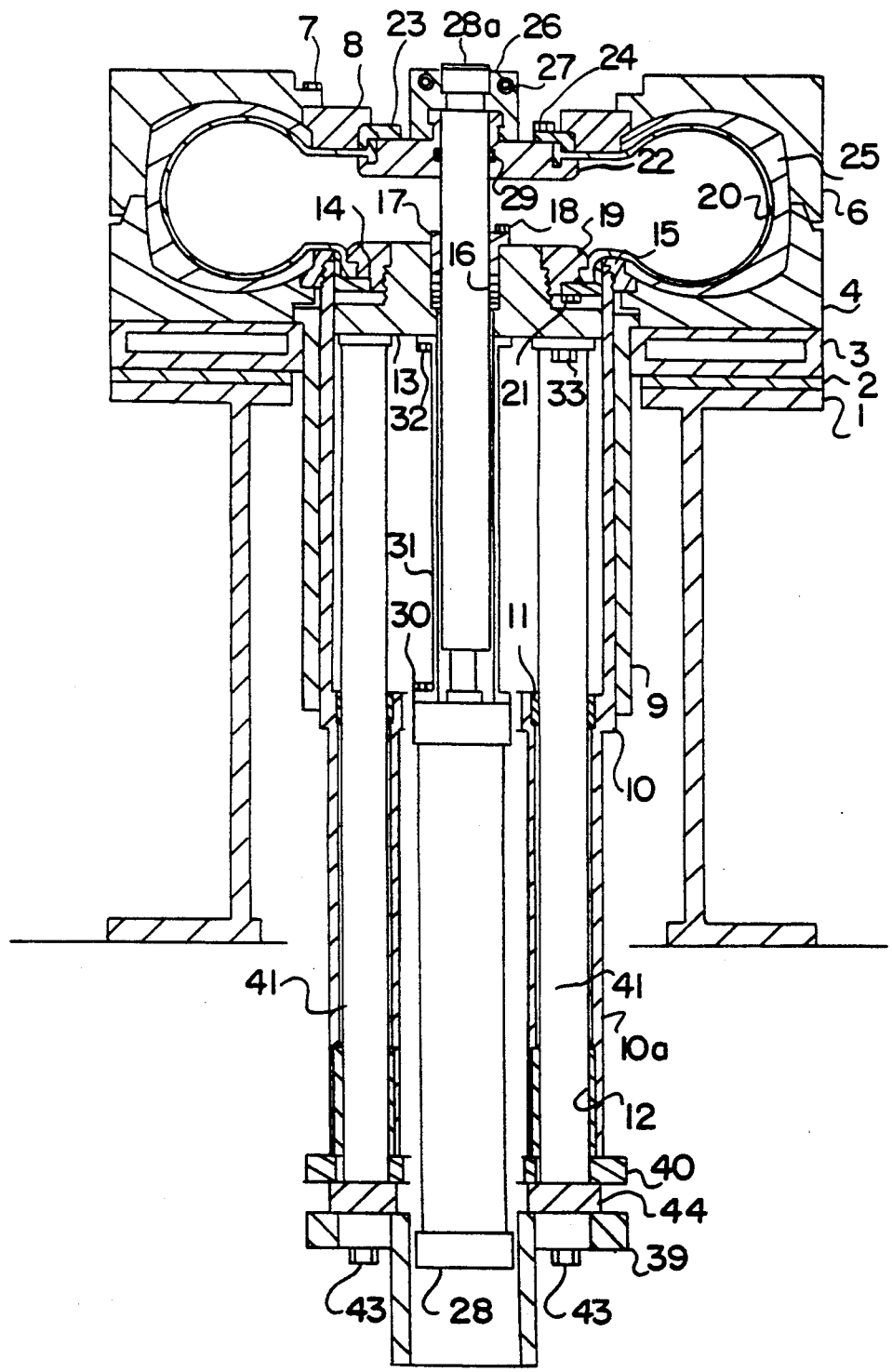
FIG. 2 is another longitudinal cross-sectional side view of the above center mechanism taken along line II—II in FIG. 5 as viewed in the direction of the arrows.
Figure 3:
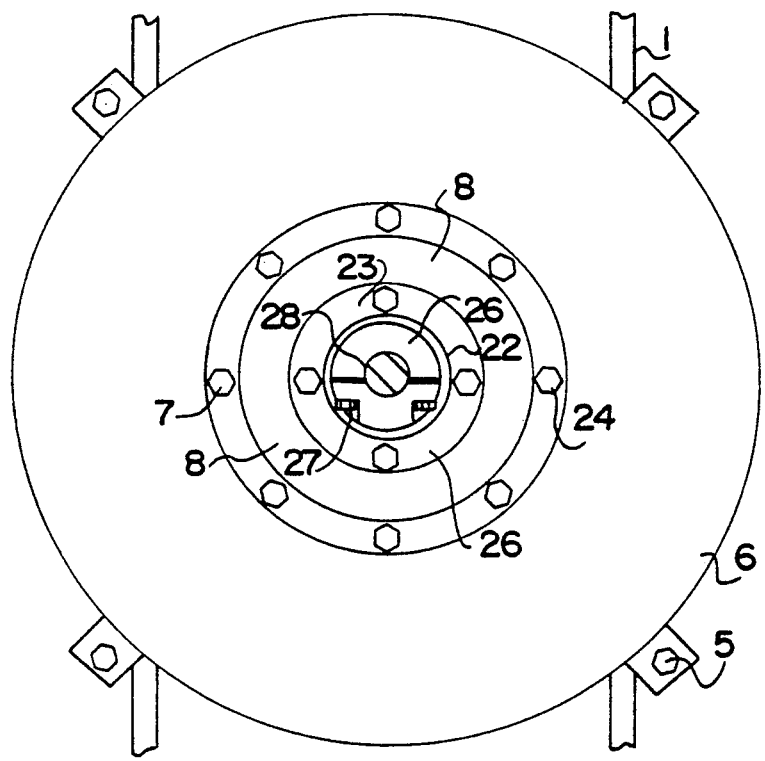
FIG. 3 is a plan view taken along line III—III in FIG. 1 as viewed in the direction of the arrows.
Figure 4:
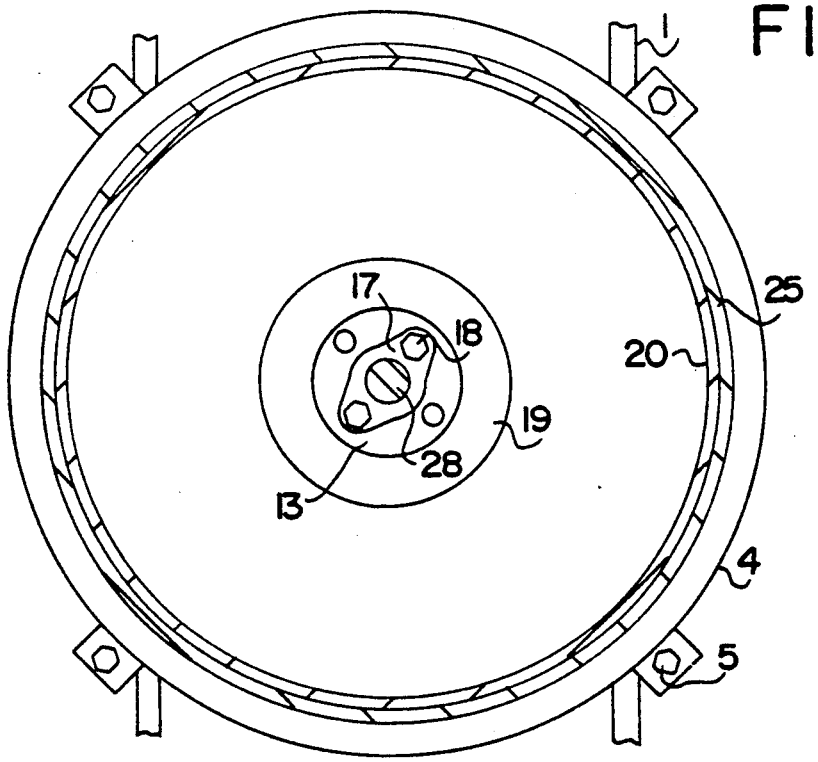
FIG. 4 is a transverse cross-sectional plan view taken along line IV—IV in FIG. 1 as viewed in the direction of the arrows.
Figure 5:
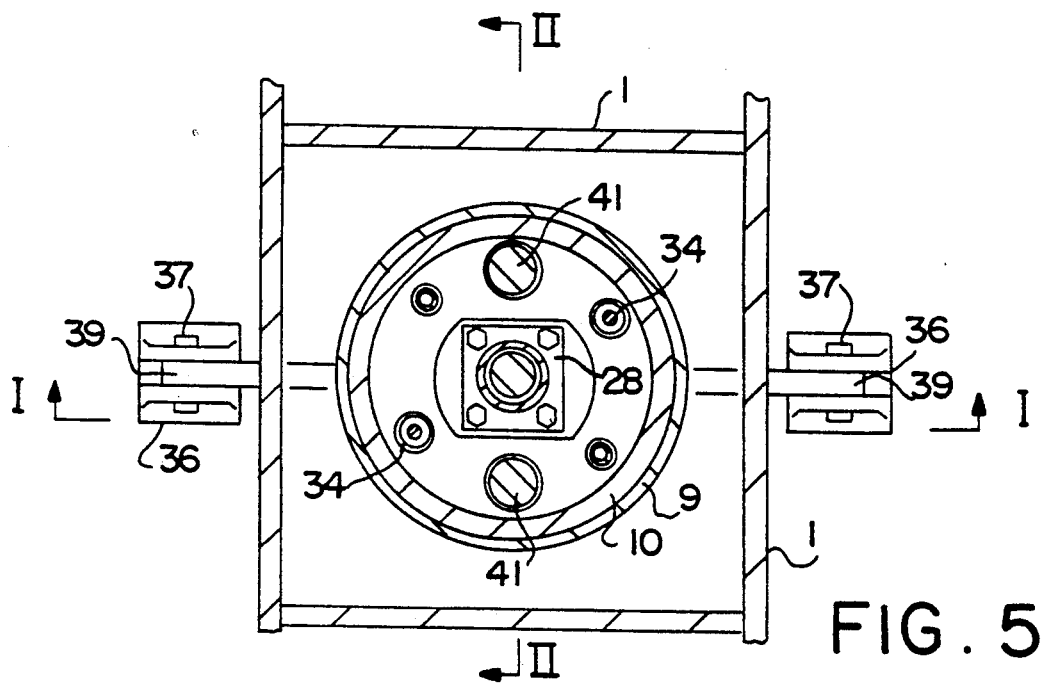
FIG. 5 is a transverse cross-sectional plan view taken along line V—V in FIG. 1 as viewed in the direction of the arrows.
Figure 6:
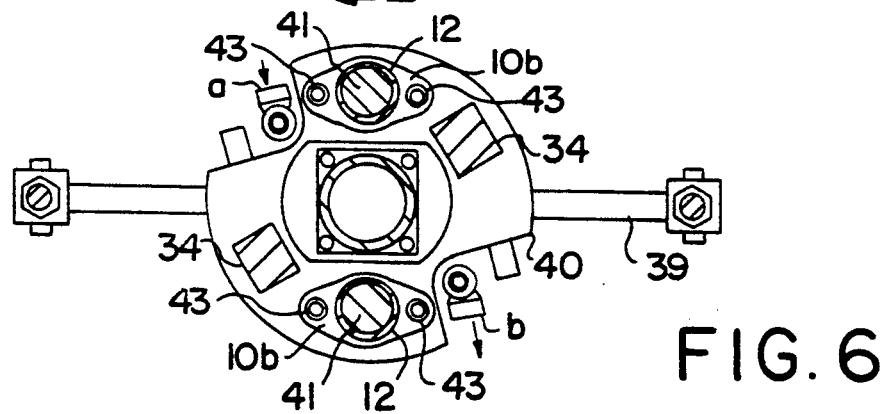
FIG. 6 is a transverse cross-sectional plan view taken along line VI—VI in FIG. 1 as viewed in the direction of the arrows.
Figure 7:
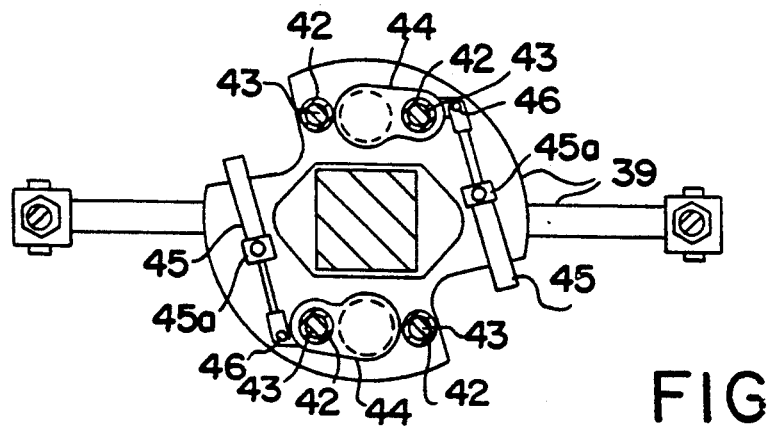
FIG. 7 is a transverse cross-sectional plan view taken along line VII—VII in FIG. 1 as viewed in the direction of the arrows.

Now a center mechanism of a vulcanizing machine according to the present invention will be described in greater detail in connection with one preferred embodiment illustrated in FIGS. 1 through 7. In these figures, reference numeral 1 designates a base, and on the upper surface of the base 1 is fixedly secured a lower heater plate 3 via a heat insulator plate 2 by means of bolts (not shown). In addition, on the upper surface of the lower heater plate 3 is fixedly secured a lower mold 4 by means of bolts 5. Reference numeral 6 designates an upper mold, and along the outer circumference of the bottom of the upper mold 6 is formed a tapered portion, which tapered portion is fitted to a tapered portion formed along the outer circumference of the top of the lower mold 4. Also, to the upper side of the inner circumference of the upper mold 6 is fixedly secured an upper bead ring 8 by means of bolts 7. Reference numeral 9 designates an outer cylinder. The upper portion of the outer circumference of the outer cylinder 9 is engaged with the lower heater plate 3. An outer circumferential surface of an inner cylinder 10 is loosely fitted to an inner circumferential surface of the outer cylinder 9. In addition, reference numeral 10a designates two cylinders which are integral with the inner cylinder 10. Outer circumferential surfaces of bushes 11 and 12 are snugly fitted to the inner circumferential surfaces of the cylinders 10a. Reference numeral 13 designates a lower ring and reference numeral 14 designates a bladder support. The inner circumferential surface of the above-mentioned inner cylinder 10 loosely fits to the outer circumferential surfaces of the lower ring 13 and the bladder support 14. Threads formed on the outer circumference of the inner cylinder 10 are engaged with female threads formed on a lower bead ring 15. ① Along the inner circumferential surface of the lower ring 13 is inserted a V-packing 16, and a packing retainer 17 is fixed thereto by means of bolts 18. ② Reference numeral 19 designate a lower clamp ring. On the outer circumferential surface of the lower clamp ring 19 is fixed an inner circumferential portion of the bottom of a bladder 20 by means of the bladder support 14 and bolts 21. Female threads formed on the inner circumferential surface of the lower clamp ring 19 are engaged with threads formed on the lower ring 13. ③ In addition, an inner circumferential portion of the top of the bladder 20 is fixed to an upper clamp ring 22 by means of a bladder retainer 23 and bolts 24. Furthermore, a vulcanizing medium is fed under pressure through a hole a of a tube provided in the lower ring 13 and is discharged through a hole b, and at that moment a tire 25 is heated and pressurized via the bladder 20 to carry out the vulcanizing operation. Reference numeral 26 is a twice-severed clamp, and by fastening bolts 27, the upper clamp ring 22 and a rod 28a of a first hydraulic cylinder 28 (denoted by reference character A in FIGS. 8 to 10) are fixed to each other via grooves on the respective members. In addition, along the inner circumferential surface of the upper clamp ring 22 is mounted an O-ring 29. A main body of the first hydraulic cylinder 28 is fixed to a spacer 31 by means of bolts 30, and the spacer 31 is fixed to the lower ring 13 by means of bolts 32. Inner circumferential surfaces of bushes 11 and 12 loosely fit to outer circumferential surfaces of two rods 41. Top end flanges of the rods 41 are fixed to the lower ring 13 by means of bolts 33. Main body flanges of two second hydraulic cylinders 34 (denoted by reference character B in FIGS. 8 to 10) are fixed to the inner cylinder 10 by means of bolts 35, and threaded portions at the tip ends of the rods of these hydraulic cylinders 34 are engaged with female screws provided on the bottom surface of the lower ring 13. In addition, the tops of two third hydraulic cylinders 36 (denoted by reference character C in FIGS. 8 to 10) are loosely coupled with ears 1a formed integrally with the base 1 via pins 37, crevices at the tip ends of the rods of these cylinders 36 are loosely coupled with a beam 39 via pins 38. Reference numeral 43 designates four bolts, and the respective bolts 43 penetrate through holes in the beam 39, through spacers 42 and through a disc 40 from below, and are threadedly engaged with female screws provided in flanges 10b at the bottom of the inner cylinder 10. Reference numeral 44 designates stoppers, and these stoppers 44 are somewhat thinner in thickness than the spacers 42. The stoppers 44 in contact with the lower end portions of the rods 41 are provided with holes which loosely fit around the outer circumferential surfaces of the spacers 42. One end of each spacer 42 is formed as an ear. A hole, is formed in the ear, and this hole as well as holes in a tip end crevice of a rod of each one of two fourth hydraulic cylinders 45 (denoted by reference character D in FIGS. 8 to 10) are loosely engaged with a pin 46. A pin section of a trunnion 45a of the fourth hydraulic cylinder 45 is loosely fitted to holes formed in the disc 40 and the beam 39 so as to be rotatable.

Now, the operation of the center mechanism of the tire vulcanizing machine illustrated in FIGS. 1 to 7 will be explained in greater detail. Assuming that vulcanization has been completed in the state shown in FIGS. 1 to 7, the upper mold 6 is removed by any external mechanism (not shown). Then after a combination of actuations in the elongating and contracting directions of the first to fourth hydraulic cylinders 28, 34, 36 and 45 have been chosen, if the machine is operated, three types of bladder operations as shown in FIGS. 8 to 10 can be effected.

Figure 8:
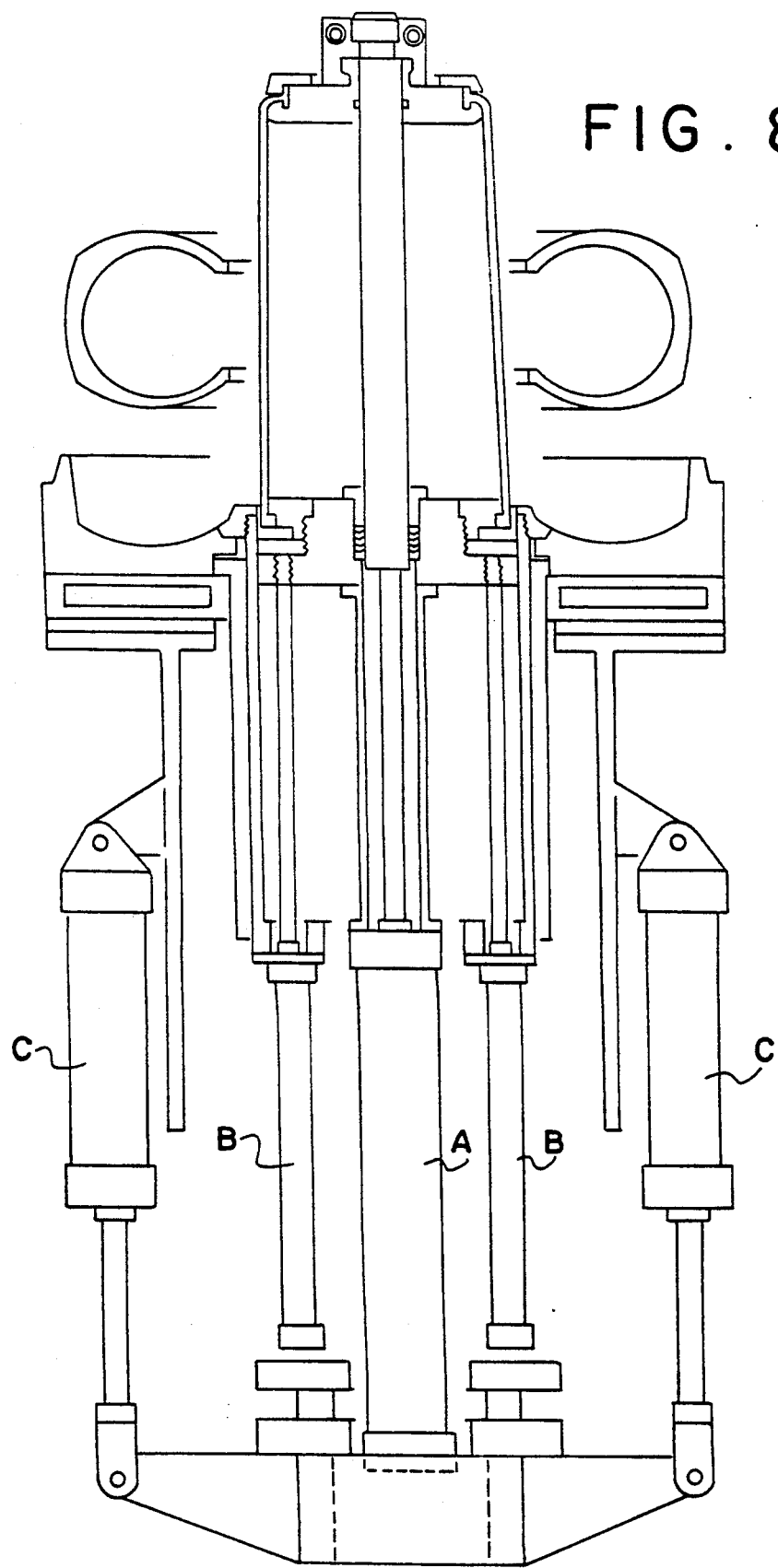
FIGS. 8 through 10 are schematic views for explaining the operations of the illustrated center mechanism.

FIG. 8 shows the case of carrying out unloading of a vulcanized tire 25 or loading of a green tire 25 under the condition where the bladder 20 is kept elongated, and at this time all the first to fourth hydraulic cylinders 28, 34, 36 and 45 are actuated in the elongating direction.

Figure 9:
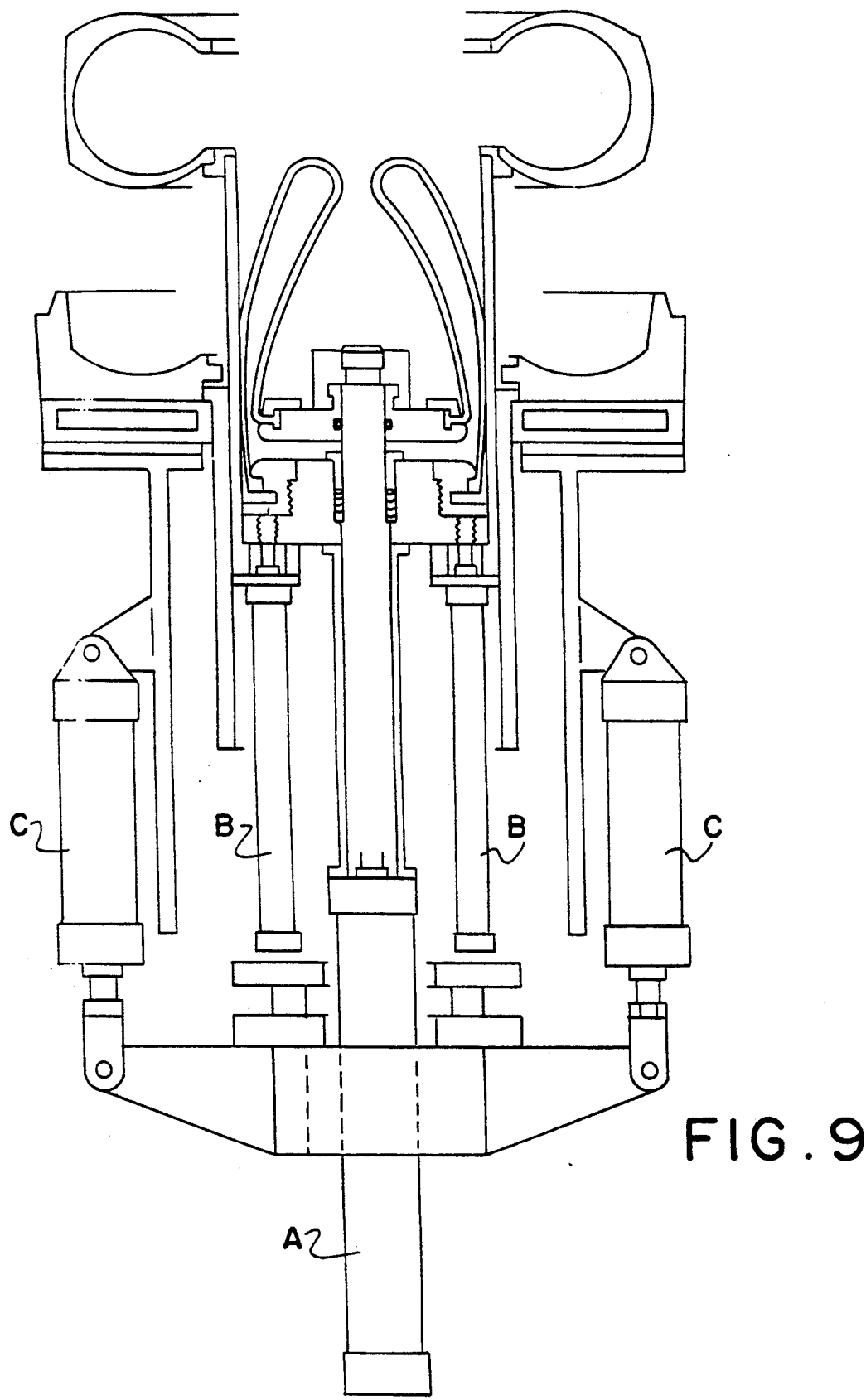

FIG. 9 shows the case where all the first to fourth hydraulic cylinders 28, 34, 36 and 45 have been actuated in the contracting direction under the condition where the bladder 20 is accommodated within the inner cylinder 10 as folded. It is to be noted that although illustration is omitted, in this case the stoppers 44 are retreated and rods 41 project downwards as penetrating through the holes in the disc 40.

Figure 10:
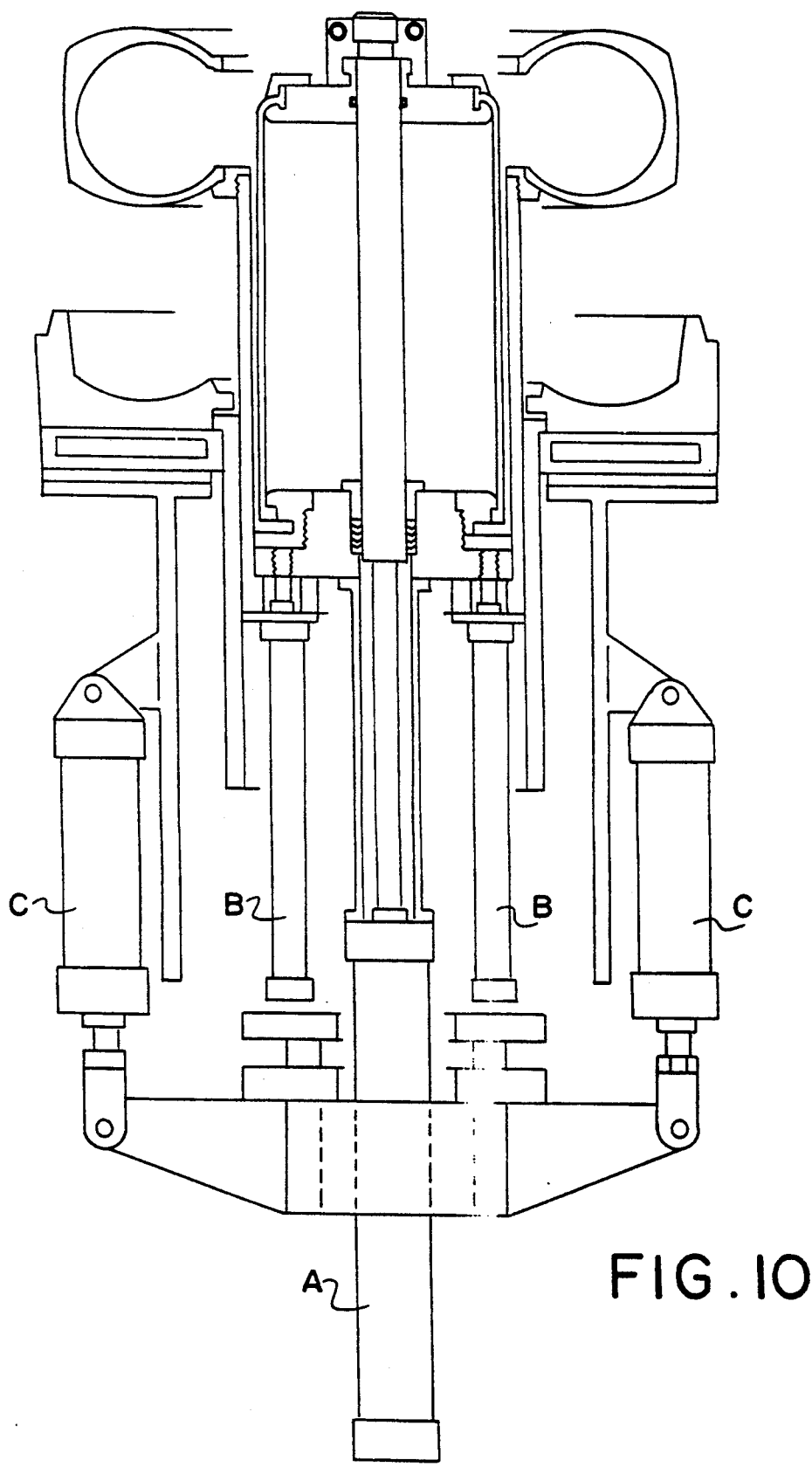

FIG. 10 shows the case where, under the condition that the bladder 20 was elongated and retracted (accommodated) within the inner cylinder 10, the first hydraulic cylinder 28 has been actuated in the elongating direction, while the second to fourth hydraulic cylinders 34, 35 and 45 have been actuated in the contracting direction.

As described in detail above, the center mechanism of a tire vulcanizing machine according to the present invention is constructed in such manner that lower end portions of a plurality of rods are inserted into holes provided in the beam so as to bear against a rotary torque upon mounting and dismounting of a lower clamp ring, and upon vulcanization a pressing force generated by a pressurized hot medium is transmitted via these rods to stoppers, but upon completion of vulcanization of the tire the stoppers are made to swing and the rods are lowered to accommodate a bladder within an inner cylinder. Hence the above-described three types of bladder operations adapted to different kinds of tires can be carried out by only changing the control without necessitating the replacement of a center mechanism, the addition of parts or the like. Thus there is an advantage in that the problems of high cost, poor removal precision and increased cycle time can be resolved.

While a principle of the present invention has been described above in connection to one preferred embodiment of the invention, it is intended that all matter contained in the above description and illustrated in the accompanying drawings shall be interpreted to be illustrative and not in a limiting sense.

What is claimed is:

1. A center mechanism of a tire vulcanizing machine, comprising:
   a lower tire vulcanizing mold having a central portion;
   a lower ring member mounted so as to be moveable into and out of said central portion of said lower mold, said lower ring member having a plurality of vertically extending rods connected thereto; and
   hydraulic cylinder means comprising a plurality of hydraulic cylinders for moving said lower ring member into said central portion and raising said rods upon vulcanization of a tire, and moving said lower ring member out of said central portion and lowering said rods upon completion of the vulcanization of the tire, wherein said hydraulic cylinder means further comprises pivotably mounted stoppers below said rods for supporting said rods upon vulcanization of the tire and pivoting upon completion of the vulcanization of the tire to allow said rods to be lowered.

2. The center mechanism of claim 1, and further comprising a bladder having an inner circumferential portion fixed to said lower ring member.

3. The center mechanism of claim 1, and further comprising an inner cylinder having an inner circumferential surface, said lower ring member being loosely fitted in said inner cylinder against said inner circumferential surface, said inner cylinder also having a lower bead ring mounted thereon.

4. The center mechanism of claim 1, and further comprising a bladder having an inner circumferential portion fixed to said lower ring member and an upper ring member, wherein said bladder has an upper inner circumferential portion fixed to said upper ring member and wherein said hydraulic means further comprises a central hydraulic cylinder connected to said upper ring member.

5. A center mechanism of a tire vulcanizing, machine, comprising:
   a lower tire vulcanizing mold having a central portion, said lower mold being mounted on a base;
   a lower ring member mounted so as to be moveable into and out of said central portion of said lower mold;
   an upper ring member above said lower ring member;
   a bladder fixed between said upper ring member and said lower ring member;
   a first hydraulic cylinder arrangement fixed between said lower ring member and said upper ring member;
   a second hydraulic cylinder arrangement connected to said lower ring member for moving said lower ring member into and out of said central portion of said lower mold, wherein said lower ring member further comprises vertically extending rods connected thereto;
   a third hydraulic cylinder arrangement connected between a beam and said base for relative movement therebetween; and
   a fourth hydraulic cylinder arrangement disposed on said beam and connected to stoppers pivotably mounted on said beam for pivotal movement between one position for supporting said vertically extending rods and another position allowing said rods to be lowered.

6. The center mechanism of claim 5, and further comprising an inner cylinder slidably mounted relative to said base, wherein said lower ring member is slidably fitted in said inner cylinder and said second hydraulic cylinder arrangement is connected between said inner cylinder and said lower ring member.

7. The center mechanism of claim 6, wherein said inner cylinder has a lower bead ring thereon at an upper end thereof.

8. The center mechanism of claim 6, and further comprising an outer cylinder fixed relative to said base, said inner cylinder being slidably disposed inside said outer cylinder.

9. The center mechanism of claim 6, wherein said inner cylinder slidably supports said vertically extending rods for relative vertical movement.

10. The center mechanism of claim 5, wherein said fourth hydraulic cylinder arrangement comprises two hydraulic cylinder connected to two respective said stoppers, there being two said vertically extending rods.

11. The center mechanism of claim 10, wherein said beam has a disc with holes therethrough for receipt of said vertically extending rods, said stoppers being pivotably mounted on said disc to cover and uncover said holes.

12. The center mechanism of claim 5, wherein said first hydraulic arrangement comprises a single hydraulic cylinder centrally fixed to said lower ring member and a piston rod connected to said upper ring member.

* * * * *